United States Patent [19]

Leister

[11] Patent Number: 5,196,686
[45] Date of Patent: Mar. 23, 1993

[54] CHECKOUT SYSTEM WITH INLAID CHECKOUT COUNTER KEYPAD

[75] Inventor: Darrel E. Leister, Cambridge, Ohio
[73] Assignee: NCR Corporation, Dayton, Ohio
[21] Appl. No.: 728,798
[22] Filed: Jul. 10, 1991

Related U.S. Application Data

[63] Continuation of Ser. No. 440,568, Nov. 22, 1989, abandoned.

[51] Int. Cl.[5] .......................... G07G 1/12; G06K 7/10
[52] U.S. Cl. .................................... 235/462; 364/405; 364/464.01
[58] Field of Search ............... 235/454, 462, 464, 383, 235/385; 250/221; 364/405, 709.12, 464.01

[56] References Cited

U.S. PATENT DOCUMENTS

| | | | |
|---|---|---|---|
| 3,876,863 | 4/1975 | Boone | 235/385 |
| 4,251,798 | 2/1981 | Swartz et al. | 340/146.3 SY |
| 4,323,888 | 4/1982 | Cole | 340/365 A |
| 4,525,799 | 6/1985 | Okawa et al. | 364/900 |
| 4,563,739 | 1/1986 | Gerpheide et al. | 364/403 |
| 4,575,623 | 3/1986 | Cononi et al. | 235/454 |
| 4,656,344 | 4/1987 | Mergenthaler et al. | 235/462 |
| 4,700,656 | 10/1987 | Cone et al. | 177/245 |
| 4,775,782 | 10/1988 | Mergenthaler et al. | 235/146 |
| 4,789,775 | 12/1988 | McClain et al. | 235/462 |
| 4,833,609 | 5/1989 | Grulke, Jr. | 364/405 |
| 4,959,530 | 9/1990 | O'Connor | 235/385 |
| 5,019,694 | 5/1991 | Collins, Jr. | 235/462 |
| 5,021,640 | 6/1991 | Muroi | 235/462 |
| 5,026,975 | 6/1991 | Guber et al. | 235/454 |
| 5,128,520 | 7/1992 | Rando et al. | 235/383 X |

FOREIGN PATENT DOCUMENTS 0327514 8/1989 European Pat. Off. .
57-043272 3/1982 Japan .

*Primary Examiner*—John Shepperd
*Assistant Examiner*—Edward H. Sikorski
*Attorney, Agent, or Firm*—Paul W. Martin; Richard W. Lavin

[57] ABSTRACT

A checkout counter includes an optical scanning system mounted therein for projecting scanning light beams through an aperture in the counter for scanning a coded label attached to a merchandise item positioned adjacent the aperture. The counter includes a keypad for use by the checkout operator to input a number representing the number of merchandise items which are of the same type enabling the items to be checked out without requiring the items to be individually scanned by the optical scanning system.

5 Claims, 5 Drawing Sheets

CHECKOUT SYSTEM WITH INLAID CHECKOUT COUNTER KEYPAD

This is a continuation of co-pending application Ser. No. 07/440,568 filed on Nov. 22, 1989 now abandoned.

BACKGROUND OF THE INVENTION

The present invention relates to checkout systems and, more particularly, to a checkout counter having means mounted in the checkout counter for processing any number of the same type of merchandise items with one scanning operation. In order to increase the speed of the checkout operation, optical scanning devices have been incorporated into the checkout counters for reading data encoded indicia on labels affixed to the purchased merchandise items. Movement of the merchandise items across the scanning device results in the scanning device reading the encoded indicia labels. Where a number of the same merchandise items are being checked out, each merchandise item has to be moved across the scanning device in order to insert the merchandise item identification code into the processing system enabling the processing system to generate the price of the item. It has been found that this type of checkout procedure represents a significant portion of the total time it takes to check out the purchases of a customer. In order to overcome this problem, prior checkout systems have required the operator to actuate a repeat key on the keyboard of the data terminal associated with the checkout operation for each item that is being repeated or the operator had to move to a data terminal device and enter the number of items purchased after which the operator turned around and scanned the item. It has been found that where a large number of the same items were purchased, no significant reduction in the checkout time was obtained using these checkout routines.

SUMMARY OF THE INVENTION

There is provided, in accordance with the present invention, a merchandise checkout counter which includes a window portion located in the top surface of the counter through which scanning light beams are projected from a scanning mechanism mounted within the counter. The light beams scan a bar code label attached to a merchandise item as the merchandise item moves across the window portion. Mounted adjacent the window portion in the top surface of the counter adjacent the operator is a keypad for use by the operator to insert the number of the same merchandise items being purchased into a processor where the information is used to calculate the total price of the same items being purchased.

It is therefore an object of the present invention to provide a new and improved checkout system which increases the speed of a merchandise checkout operation.

It is another object of the present invention to provide such a checkout operation by enabling the checkout operator to scan one of a number of the same type of merchandise item being purchased without repeating the movement of the remaining items past the optical scanner to check out the items.

BRIEF DESCRIPTION OF THE DRAWINGS

These and other objects, features, and advantages of the present invention will become apparent from the following description and the attached drawings wherein like reference numerals indicate like or corresponding parts throughout the several views and wherein.

DETAILED DESCRIPTION OF THE PREFERRED EMBODIMENT

Figure 1:
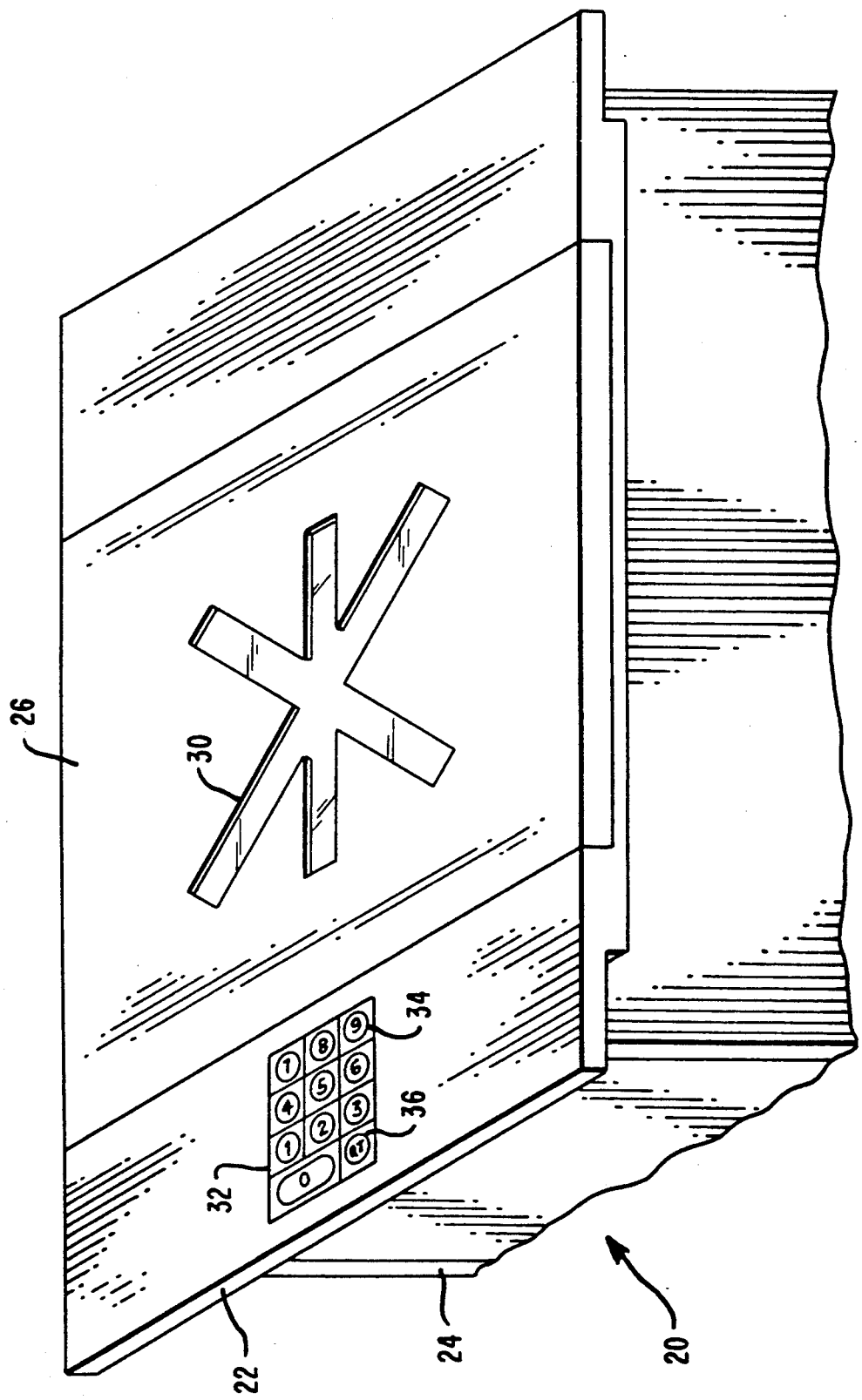
FIG. 1 is a perspective view of a portion of a checkout counter showing one embodiment of the present invention.

Referring now to FIG. 1, there is shown a perspective view of a portion of a checkout counter generally indicated by the numeral 20 which includes a counter surface 22 and a support stand 24. Mounted flush to the surface 22 is the top surface plate 26 of an optical bar code reader 28 (FIG. 5) mounted within the counter. Located in the top plate 26 is a star-shaped window 30 through which scanning light beams from the bar code reader are projected to scan a bar code pattern on a label attached to a purchased merchandise item moving across the window 30. Mounted in the surface 22 of the counter 20 is a keypad 32 which includes ten numerical keys 34 and a transaction key 36. The keypad 32 is positioned adjacent the operator 37 (FIG. 6).

Figure 2:
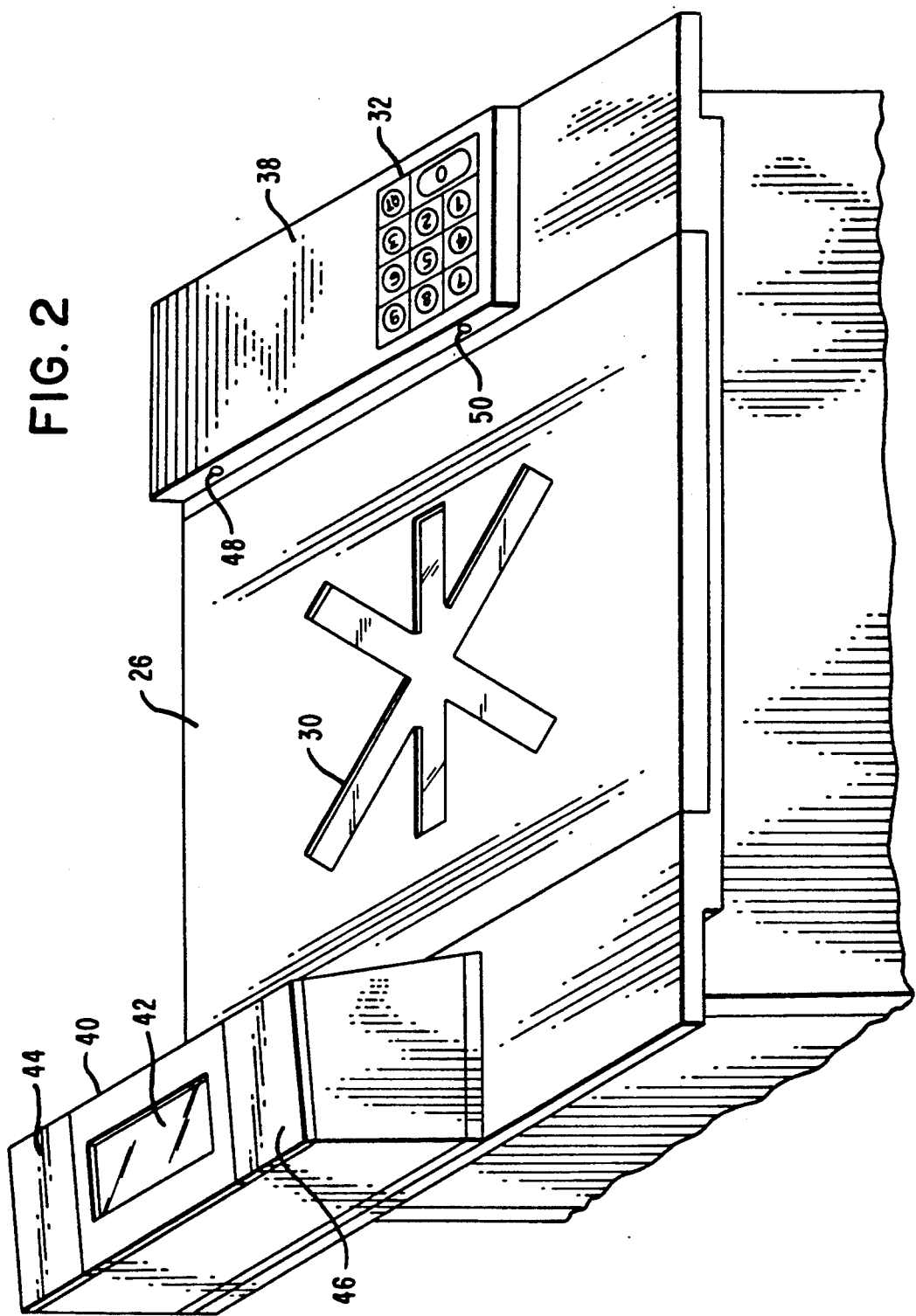
FIG. 2 is a perspective view of a portion of a checkout counter showing another embodiment of the present invention.
Figure 6:
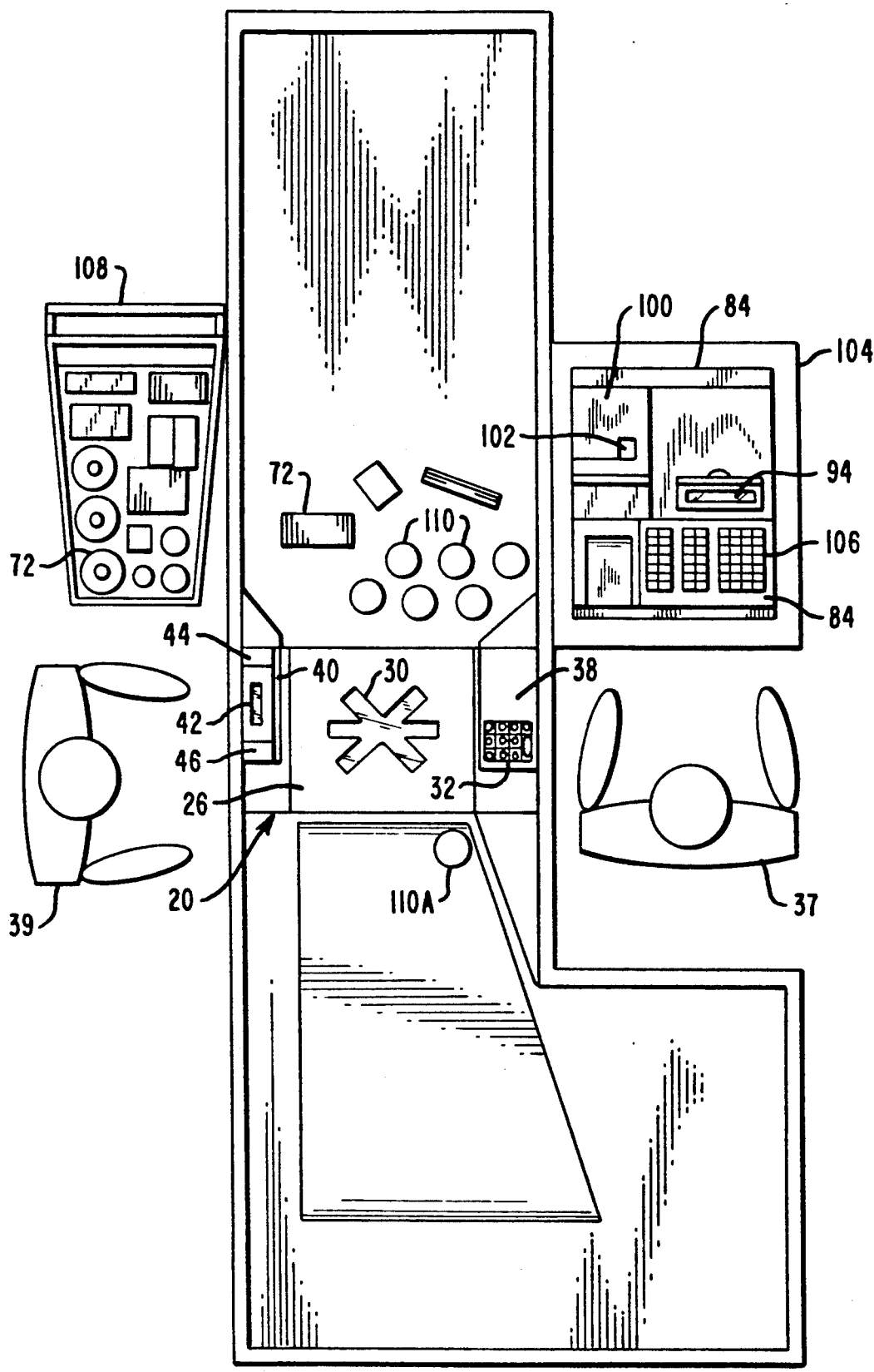
FIG. 6 is a top plan view of a checkout station which includes the checkout counter of FIG. 2 showing the location of the keypad on the checkout counter with respect to the location of the checkout operator.

In FIG. 2, there is shown a similar arrangement in which the keypad 32 is mounted in a rail member 38 located along one edge of the counter 20 adjacent the operator 37 (FIG. 6). Located along the opposite side of the counter 20 adjacent the customer 39 (FIG. 6) is a raised housing member 40 which includes a customer display 42 and a pair of indicator lights 44 and 46 indicating whether the scan operation resulted in a good read (green) or a bad read (red). Also located in the rail member 38 and the housing member 40 are oppositely located photodiodes 48 and 50 (FIGS. 2 and 3) and photodetectors 52 and 54 (FIG. 3) comprising the item gates unit 56 (FIG. 4) for sensing the presence or absence of a merchandise item on the top surface 22 of the counter 20 for use in controlling the operation of the bar code reader.

Figure 3:
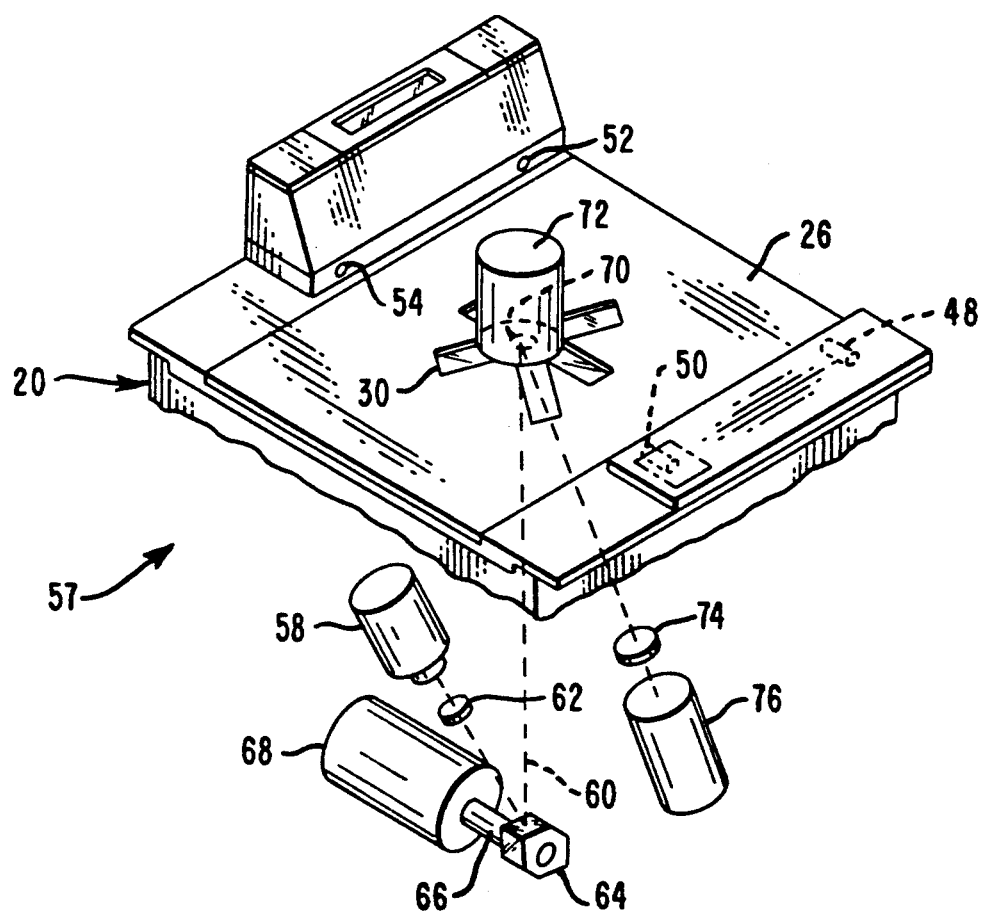
FIG. 3 is a fragmentary perspective view of the mechanical elements of a bar code reader.

Referring now to FIG. 3, there is shown a perspective view of the mechanical structure of the bar code reader 28 (FIG. 5) generally indicated by the numeral 57 which includes a light source 58 emitting an optical light beam 60 in the visible or near visible spectrum, the light beam 60 being focused by a lens system 62 onto a multifaceted mirror 64. The mirror 64 is secured to the shaft 66 of a motor 68 which rotates the mirror 64 at a substantially constant speed. The rotating mirror 64 projects the reflected light beam 60 through the window 30 to scan the encoded indicia on a label 70 attached to a purchased merchandise item 72 positioned adjacent the window 30. The rotation of the mirror 64 results in a succession of light beams 60 forming a scanning pattern which scans the encoded label 70 in a manner that is well known in the art.

The scanning light beams 60 are reflected off the label 70 through an optical filter 74 to a photo-responsive detector device such as a photo-multiplier 76 which converts the reflected light beams into electrical signals, the amplitude of which corresponds to the amount of light received. The electrical signals are transmitted to a microprocessor 78 (FIG. 4) for processing in a manner that will now be described.

Figure 4:
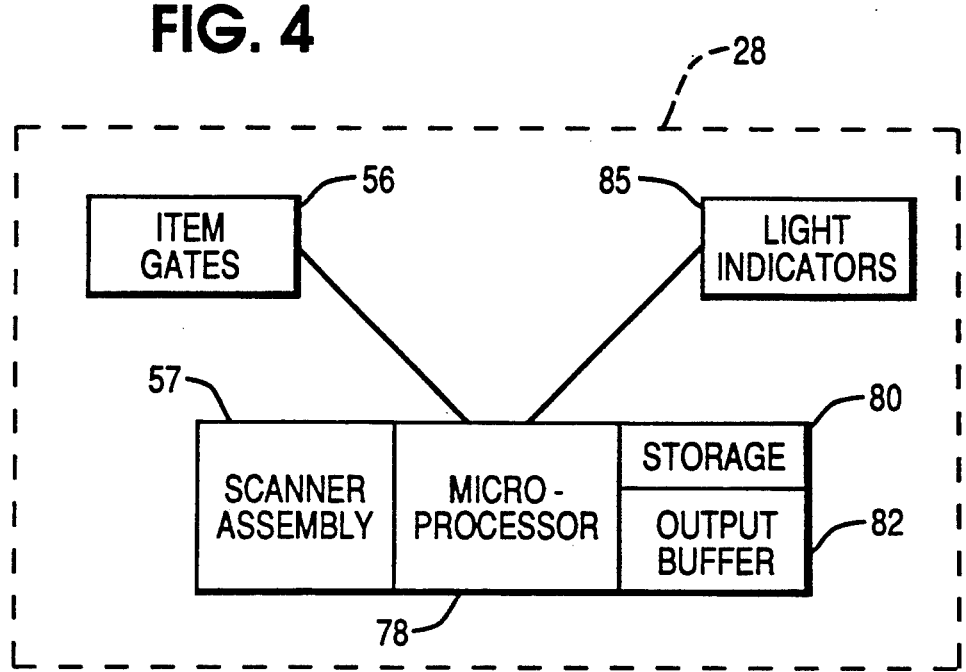
FIG. 4 is a schematic diagram of the bar code reader.
Figure 5:
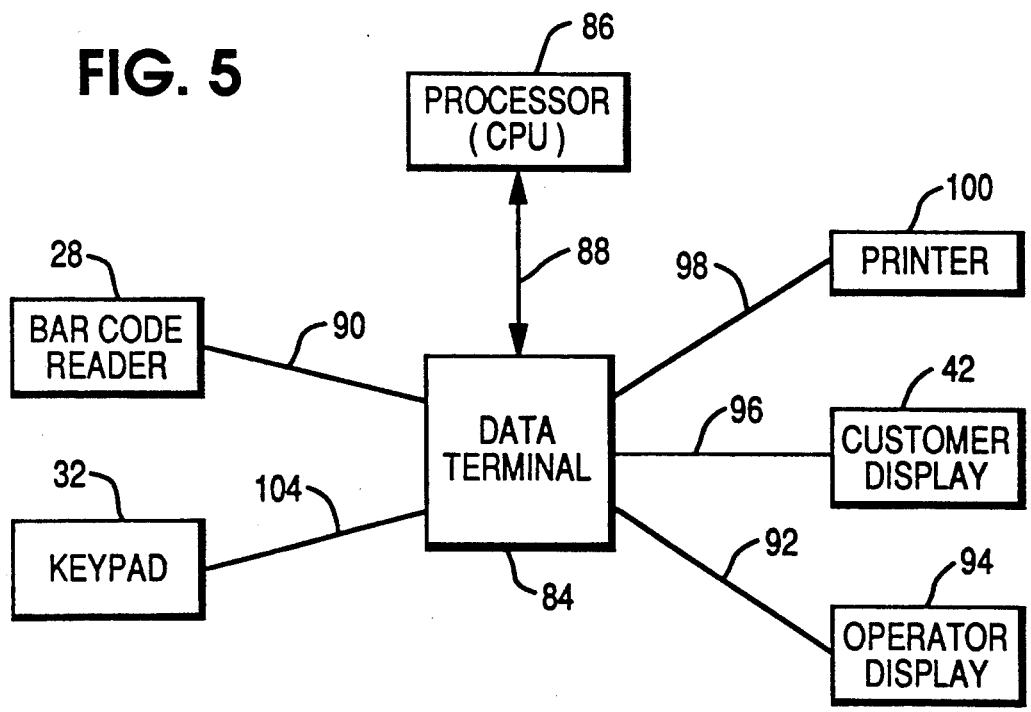
FIG. 5 is a block diagram of the checkout system which utilizes the present invention.

Referring now to FIG. 4, there is shown a block diagram of the bar code reader 28 (FIG. 5). The reader includes the scanner assembly 57 (FIG. 3), the microprocessor 78 for checking and decoding the encoded data read by the scanner assembly 57, a conventional memory storage unit 80, an output buffer 82 utilized for transmitting the data read by the scanner assembly to a processor (not shown) located in a data terminal device 84 (FIGS. 5 and 6) associated with the checkout counter 20 in a manner to be described hereinafter. Coupled to the microprocessor 78 is the item gates unit 56 which comprises the photodiode 48 and photodetector 52 (FIG. 3) as an upstream item gate and the photodiode 50 and photodetector 54 comprising the downstream item gate. As is well known in the art, the item gates detect the presence or absence of a merchandise item on the top plate 26 (FIGS. 1-3 inclusive) of the bar code reader 28 for controlling the operation of the bar code reader. Also coupled to the microprocessor 78 is a light indicators unit 85 comprising the indicator lights 44 and 46 (FIG. 2). The electrical signals representing the data read by the scanner assembly 57 (FIG. 3) and outputted by the photo-multiplier 76 are converted to digital signals and transmitted to the microprocessor 78 which processes the data. The microprocessor 78 will decode and transmit the data to the data terminal device 84 (FIGS. 5 and 6) which in turn transmits the data to a remote processor 86 (FIG. 5) where the data is used by the processor to look up in lookup tables the price of the purchased merchandise item read by the bar code reader 28.

The microprocessor 78 will also decode and check the encoded data received from the multiplier 76 to determine if the data is valid or not and will generate control signals indicating whether the scanning operation produced a good or bad read. The microprocessor 78 will transmit such signals to the light indicators 44 and 46 (FIG. 2). If a bad read operation is indicated, the operator will then repeat the movement of the purchased merchandise item across the window 30.

Referring now to FIG. 54, there is shown a block diagram of the checkout system which includes the data terminal device 84 (FIG. 6) coupled over line 88 to the remote processor 86 which contains lookup tables containing the price of the purchased merchandise items. Coupled over line 90 to the terminal device is the optical bar code reader 28 for generating data read from the coded label on the purchased merchandise item, which as previously described, is used to obtain the price of the item from the processor 86. The price information is transmitted to the terminal device 84 which outputs over line 92 the price data to an operator display 94 located on the terminal device 84 and over line 96 to the customer display 42 (FIG. 2). The price information is also transmitted over line 98 to a printer 100 located in the terminal device for printing the price of the purchased item on a receipt member 102 (FIG. 6). Coupled over line 104 to the terminal device 84 is the keypad 32 for transmitting data concerning the number of items sold as will now be described.

Referring now to FIG. 6, there is shown a plan view of a checkout station which includes the counter 20 (FIGS. 1 and 2), the housing member 40 including the customer display 42 and the indicator lights 44 and 46 (FIG. 2) and the window 30 of the bar code reader 28 (FIG. 6). Mounted in the rail member 38 is the keypad 32 located adjacent the operator 37. Positioned adjacent the counter 20 is a support stand 104 on which is located the data terminal device 84 which includes a keyboard 106, the operator display 94 (FIG. 5), the printer 100 which issues the receipt 102 on which is printed data pertaining to the purchased merchandise items. As part of the checkout operation, the customer 39 will move a shopping cart 108 containing the purchased merchandise items 72 to a position adjacent the window 30. The customer then positions the merchandise items 72 on the counter 20 adjacent the top plate 26 of the bar code reader enabling the operator 37 to move the items past the window 30 as part of the scanning operation. If a number of the merchandise items purchased are the same such as items 110, the operator will count the number of such items and enter the amount in the keypad 32 utilizing the appropriate key 34 (FIG. 1) and move the first of the items 110A past the window 30. The operator will then actuate the transaction key 36 resulting in the data from the keypad being transmitted to a processor (not shown) in the terminal device 84. In response to receiving this data, he processor will enable the terminal device 84 to operate the displays 42 and 94 to display a logo indicating the number of items being processed together with the total price of the items. This information is also printed by the printer 100 as part of the receipt record 102. At the end of the checkout operation, the operator 37 will actuate a total key 105 on the keyboard 106 of the terminal device 84 resulting in the issuance of the receipt record 102 by the printer 100 which is removed by the operator and given to the customer as proof of purchase.

It can thus be seen that there has been described a checkout system which increases the speed of the checkout operation where the merchandise items processed include a large number of the same type of merchandise items. The use of a keypad located on the checkout counter adjacent the checkout operator enables the operator to check out a large number of items in the minimum amount of time while requiring very little movement on the part of the operator.

Although the presently preferred embodiment of the invention has been described, it will be understood that various changes may be made within the scope of the appended claims.

What is claimed is:

1. A checkout system comprising:
    a checkout counter having a supporting surface for supporting purchased merchandise items adjacent to a position for an operator;
    an aperture in said supporting surface;
    an optical scanner mounted in the checkout counter adjacent the aperture for projecting scanning light beams through the aperture for reading coded labels on a merchandise item positioned adjacent the aperture and outputting the data read from the coded label;
    a data terminal device adjacent the operator and coupled to the optical scanner for receiving the data read from the optical scanner for use in printing a record of the checkout operation and including a first keypad having a first transaction key and a total key; and a second keypad mounted in the checkout counter between the optical scanner and the operator and coupled to the data terminal device for use by the operator for the sole purpose of entering a single numerical value corresponding to the number of merchandise items being purchased which are of the same type enabling the data terminal device to print the total amount due for the purchased merchandise items without requiring each one of a plurality of items of the same type to be individually scanned and individually entered using the first transaction key in the first keypad.

2. The checkout system of claim 1 in which the checkout counter includes a rail member having a top surface and extending along one edge of the counter adjacent the checkout operator, said second keypad being mounted flush with the top surface of the rail member.

3. The checkout system as recited in claim 2 in which the second keypad comprises only ten numerical keys and a second transaction key.

4. A method for processing a plurality of purchased merchandise items comprising the steps of:

providing an optical bar code reader in a checkout counter having an aperture in the supporting surface of the counter for projecting scanning light beams through the aperture at bar code labels affixed to each of the purchased merchandise items and including a rail member extending along one edge of the counter adjacent a checkout operator having a top surface contiguous with the supporting surface;

scanning the first merchandise item of a plurality of the same type of merchandise items above the aperture;

transmitting the information from the label on the first merchandise item to a processing device having a first keypad with a first transaction key and a total key;

registering a single numerical value corresponding to the number of a plurality of purchased merchandise items of the same type to be processed from a second keypad flush with the top surface of the rail member between the bar code reader and the operator and including only ten numerical keys and a second transaction key for transmitting the number of merchandise items of the same type being purchased to the processing device;

transmitting the number of merchandise items of the same type being purchased to the processing device enabling the processing device to display the price of all of the merchandise items of the same type purchased without requiring each one of a plurality of items of the same type to be individually scanned and individually entered using the first transaction key in the first keypad;

displaying the total number of merchandise items of the same type being purchased on a display in response to the step of transmitting; and generating a signal from the total key on the first keypad mounted on the processing device for adding the prices of all items being purchased.

5. A checkout system comprising:

a checkout counter having a supporting surface for supporting purchased merchandise items and including a rail member having a top surface contiguous with the supporting surface extending along one edge of the counter adjacent a checkout operator;

an operature in said supporting surface;

an optical scanner mounted in the checkout counter adjacent the aperture for projecting scanning light beams through the aperture for reading coded labels on a merchandise item positioned adjacent the aperture and outputting the data read from the coded label;

a data terminal device adjacent to the checkout counter and coupled to the optical scanner for receiving the data read from the optical scanner for use in printing a record of the checkout operation and including a first keypad having a first transaction key and a total key; and a second keypad, including only ten numerical keys and a second transaction key, mounted in the checkout counter, flush with the top surface of the rail member between the optical scanner and the operator for easy access by the checkout operator, and coupled to the data terminal device for use by the operator to enter a single numerical value corresponding to the number of merchandise items being purchased which are of the same type enabling the data terminal device to print the total amount due for the purchased merchandise items without requiring each one of a plurality of items of the same type to be individually scanned and individually entered using the first transaction key in the first keypad.

* * * * *

UNITED STATES PATENT AND TRADEMARK OFFICE
CERTIFICATE OF CORRECTION

PATENT NO.  : 5,196,686

DATED       : March 23, 1993

INVENTOR(S) : Darrel E. Leister

It is certified that error appears in the above-identified patent and that said Letters Patent is hereby corrected as shown below:

Column 6, line 22, delete "operature" and substitute --aperture--.

Signed and Sealed this

First Day of February, 1994

Attest:

BRUCE LEHMAN

Attesting Officer

Commissioner of Patents and Trademarks